UNITED STATES PATENT OFFICE.

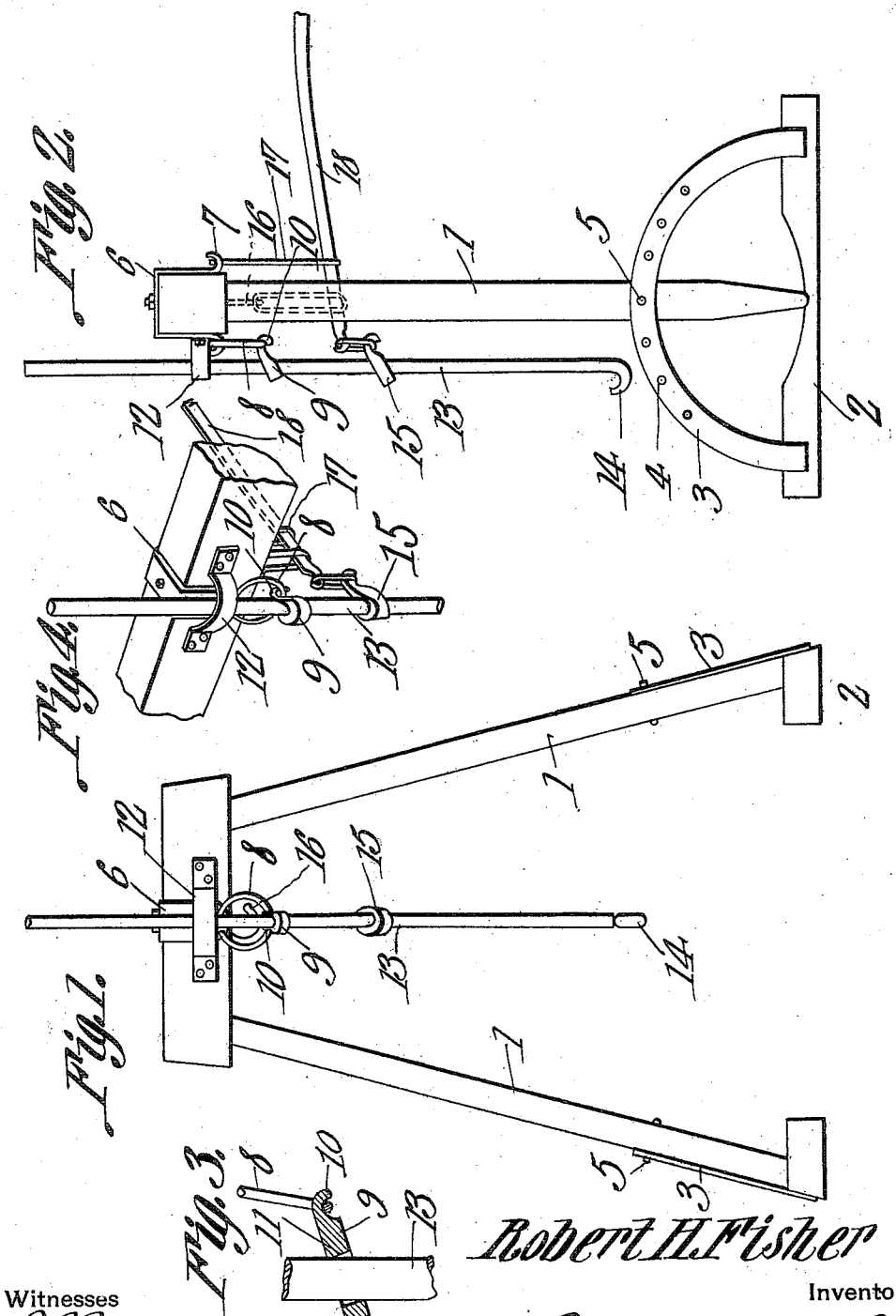

ROBERT H. FISHER, OF BLACKSBURG, VIRGINIA.

GRUBBING-FRAME.

983,129.  Specification of Letters Patent.  Patented Jan. 31, 1911.

Application filed April 21, 1910. Serial No. 556,892.

*To all whom it may concern:*

Be it known that I, ROBERT H. FISHER, a citizen of the United States, residing at Blacksburg, in the county of Montgomery and State of Virginia, have invented a new and useful Grubbing-Frame, of which the following is a specification.

This invention relates to a grubbing frame and consists in the novel construction and arrangement of its parts as hereinafter shown and described.

The object of the invention is to provide a simple and light structure adapted to be readily transported from place to place and which may be effectually used for pulling roots and stumps and so forth from the soil.

With this object in view the structure includes a trestle having a yoke mounted upon the same. A connecting ring is pivoted to the yoke and a clutch ring is supported by said connecting ring. A bar is adapted to pass through the clutch ring and has its upper portion held in proper relation to the trestle by means of a guide. The bar is provided at its lower end with means for attachment or means whereby it may be connected with the roots or stumps to be removed.

In the accompanying drawings:—Figure 1 is a side elevation of the grubbing frame. Fig. 2 is an edge elevation of the same. Fig. 3 is a detail sectional view through the clutch ring and adjacent parts. Fig. 4 is a perspective view of a portion of the grubbing frame.

The grubbing frame includes a trestle 1 which is mounted at the lower ends of its legs upon pedal frames 2. The frames 2 include arcuate pieces 3 which lie against the side portions of the legs 1 and which are provided with perforations 4. Bolts 5 are adapted to be passed through the said perforations and the legs of the trestle 1 and serve as means for adjustably securing the pedal frames 2 at the lower end of the legs of the trestle. By such an arrangement the trestle may be positioned at an angle of 90 degrees to the plane of the lower surfaces of the frame 2 or they may be positioned at any other desired angle. Therefore the device may be used upon hillsdes as well as upon level ground. A yoke 6 is located over the upper intermediate portion of the trestle 1 and is provided at its ends with hooks 7. A ring 8 is hingedly connected with one of the hooks 7 and in turn supports a clutch ring 9. The ring 9 is provided at one side with a curved lug 10 which enters and engages the ring 8 and the said ring 9 is further provided with a perforation 11 adapted to have frictional contact at its diametrically opposite upper and lower edges with a supporting rod as will be hereinafter explained. A guide 12 is attached to one side of the upper intermediate portion of the trestle 1 and the upper portion of a rod 13 passes through the said guide. The said rod 13 also passes through the perforation 11 provided in the clutch ring 9 and which is gripped by the edges of the said perforation in the manner as shown in Fig. 3 of the drawings. The rod 13 is preferably fashioned at its lower end into a hook 14 for attachment to the object to be lifted. A hook 16 extends downwardly from the upper intermediate portion of the trestle 1 and may be used as a means for connecting a chain or other sustaining device to the trestle in order to hold a root or stump in an elevated position while the draw rod 13 is being disconnected therefrom in order to be connected with the root or stump at another point. A clutch ring 15 is also located upon the rod 13 and a link 17 may be engaged with one of the hooked ends 7 of the yoke 6. A lever 18 may be passed through the link 17 and at its working end may be connected with the hook of the clutch ring 15. The said lever and its attachment may be used to lift the rod 13 through the clutch ring 9.

In operation the trestle is placed over a stump or root and the hooked extremity 40 of the draw rod 13 is connected with the same in any appropriate manner. The rod 13 is then moved vertically by means of the lever and as the rod passes through the clutch ring 9 it may slip freely in an upward direction but as soon as the rod 13 gravitates the clutch ring 9 is swung down so that the opposite edges of the opening 11 clutch or grip the rod and prevent the same from descending. As soon as the root or stump has been elevated to the desired extent it may be connected by means of a chain or similar device with the hook 16 and thus the rod 13 is relieved of the weight of the load. When this is done the outer portion of the clutch ring 9 may be lifted and the rod 13 will gravitate to the surface of the ground.

Having described the invention what I claim as new and desire to secure by Letters Patent is:—

A grubbing frame comprising a trestle, a yoke mounted upon the intermediate portion thereof, and having hooked extremities located at the opposite sides of the trestle, a hook depending from the intermediate portion of the trestle, connecting rings pivotally engaging the hooks of the yoke, a guide attached to the intermediate portion of the trestle, and located at the side thereof, a clutch ring pivotally supported by one of the connecting rings, a draft rod passing through the clutch ring and said guide, a lever pivotally supported in the other of said connecting rings, and a second clutch ring pivotally connected to said lever and receiving the intermediate portion of said draft rod.

In testimony that I claim the foregoing as my own, I have hereto affixed my signature in the presence of two witnesses.

ROBERT H. FISHER.

Witnesses:
 T. C. MARTIN,
 D. B. PRICE.